(12) United States Patent
Jones

(10) Patent No.: US 9,821,722 B1
(45) Date of Patent: Nov. 21, 2017

(54) ITEM HOLDER FOR USE WITH AN AIR CONDITIONING SYSTEM

(71) Applicant: Doug Jones, Waikoloa, HI (US)

(72) Inventor: Doug Jones, Waikoloa, HI (US)

( * ) Notice: Subject to any disclaimer, the term of this patent is extended or adjusted under 35 U.S.C. 154(b) by 273 days.

(21) Appl. No.: 14/642,841

(22) Filed: Mar. 10, 2015

(51) Int. Cl.
*B60R 11/00* (2006.01)

(52) U.S. Cl.
CPC ....... *B60R 11/00* (2013.01); *B60R 2011/0008* (2013.01)

(58) Field of Classification Search
CPC ......................... B60R 11/00; B60R 2011/0008
USPC ........................................................ 224/483
See application file for complete search history.

(56) References Cited

U.S. PATENT DOCUMENTS

| 915,206 | A | * | 3/1909 | McCord | A24F 15/18 |
| | | | | | 206/101 |
| 1,816,049 | A | * | 7/1931 | Larner | A24F 19/0064 |
| | | | | | 206/37 |
| 2,628,054 | A | * | 2/1953 | Fazakerley | B60N 3/103 |
| | | | | | 211/74 |
| 2,645,392 | A | | 7/1953 | Gottsegen et al. | |
| 2,678,184 | A | * | 5/1954 | Erdody | A47J 47/16 |
| | | | | | 248/302 |
| 2,735,597 | A | * | 2/1956 | Treleven | B60R 7/082 |
| | | | | | 206/5 |
| 3,163,338 | A | | 12/1964 | Gottsegen | |
| 3,604,020 | A | * | 9/1971 | Moisa | E03D 9/038 |
| | | | | | 4/227.1 |
| 3,986,649 | A | * | 10/1976 | Heimstra | B60R 7/043 |
| | | | | | 211/42 |
| 4,478,052 | A | | 10/1984 | McDowell | |
| 4,653,289 | A | | 3/1987 | Hodgetts | |
| 4,852,843 | A | * | 8/1989 | Chandler | B60N 3/103 |
| | | | | | 220/737 |
| 4,896,858 | A | * | 1/1990 | Sokolski | B60N 3/106 |
| | | | | | 248/231.81 |
| 5,012,654 | A | * | 5/1991 | Gatti | B60N 3/103 |
| | | | | | 165/41 |
| 5,092,395 | A | * | 3/1992 | Amidzich | B60N 3/18 |
| | | | | | 165/41 |
| 5,181,555 | A | | 1/1993 | Chruniak | |
| 5,246,190 | A | * | 9/1993 | Swirkal | B60K 37/04 |
| | | | | | 211/86.01 |

(Continued)

FOREIGN PATENT DOCUMENTS

WO WO9302882 2/1993

*Primary Examiner* — Peter Helvey
(74) *Attorney, Agent, or Firm* — Goldstein Law Offices, P.C.

(57) ABSTRACT

A unitary item holder enabling the cooling and solidification of items within a vehicle having an air conditioning system and an associated air vent, especially those which have melted within the vehicle. The item holder includes a plate having a plate axis, a pocket, and a directly opposing hook end configured for sliding within the air vent and anchoring around a slat horizontally extending therein, such that the cool air from the conditioning system can be used to cool and solidify the items. The hook end is defined via the plate extending downwardly away from the plate axis. The pocket includes a pocket defined via the plate extending upwardly away from the plate axis for holding the melted items. In an example embodiment, the pocket further includes a cooling component for retaining coolness such that items can also remain cool and solidified when the vehicle is not running.

17 Claims, 6 Drawing Sheets

(56) References Cited

U.S. PATENT DOCUMENTS

| | | | | |
|---|---|---|---|---|
| D340,622 S | * | 10/1993 | Park | D6/513 |
| D368,982 S | * | 4/1996 | Black | D28/38 |
| D370,681 S | * | 6/1996 | Diamond | D14/252 |
| 5,639,052 A | * | 6/1997 | Sauve | B60N 3/103 224/926 |
| D390,699 S | * | 2/1998 | Goldenberg | D3/218 |
| D395,545 S | * | 6/1998 | Crim, Jr. | D3/218 |
| 5,785,222 A | | 7/1998 | Basso et al. | |
| 5,961,083 A | | 10/1999 | Hartmann et al. | |
| D451,915 S | * | 12/2001 | Dalmau | D14/253 |
| 6,364,260 B1 | * | 4/2002 | Lorincz | A47B 96/06 211/113 |
| D465,646 S | * | 11/2002 | Hendrickson | D3/218 |
| 6,474,611 B1 | | 11/2002 | Deaton | |
| 6,560,983 B1 | * | 5/2003 | Schimmeyer | B60N 3/104 248/311.2 |
| D516,026 S | * | 2/2006 | Barrett | D13/108 |
| D536,016 S | * | 1/2007 | Dayan | D14/126 |
| 7,766,294 B2 | * | 8/2010 | Schimmeyer | B60N 3/103 220/482 |
| D655,702 S | * | 3/2012 | Saxton | D12/422 |
| D656,932 S | * | 4/2012 | Wikel | D12/415 |
| D663,726 S | * | 7/2012 | Gourley | D14/251 |
| 8,322,584 B2 | * | 12/2012 | Dethmers | B60H 1/00592 224/268 |
| D690,108 S | * | 9/2013 | Goodman | D3/306 |
| D707,221 S | * | 6/2014 | Hodapp | D14/253 |
| D756,987 S | * | 5/2016 | Taing | D14/253 |
| D765,581 S | * | 9/2016 | Pumphrey | D12/416 |
| D767,471 S | * | 9/2016 | Jones | D12/425 |
| 2004/0040994 A1 | * | 3/2004 | Parcelles | B60N 3/08 224/483 |
| 2007/0241152 A1 | * | 10/2007 | Josephs | B60N 3/104 224/483 |
| 2008/0210726 A1 | * | 9/2008 | Josephs | B60N 3/103 224/483 |
| 2013/0200124 A1 | | 8/2013 | Burwinkel et al. | |
| 2014/0021233 A1 | * | 1/2014 | Strole | B60R 11/00 224/545 |
| 2014/0034697 A1 | * | 2/2014 | Mak | B60N 3/103 224/483 |

* cited by examiner

ITEM HOLDER FOR USE WITH AN AIR CONDITIONING SYSTEM

TECHNICAL FIELD

The present disclosure relates generally to an item holder for use with an air conditioning system. More particularly, the present disclosure relates to an item holder configured for holding an array of items and anchoring within an air vent of a vehicle for cooling and/or solidifying items via the cool air of the conditioning system.

BACKGROUND

The average driver can spend many hours of their week in a vehicle, whether commuting to and from work, having an occupation which requires the driver to transport goods to a given destination, or simply, while running errands. As a result, many drivers perform basic daily needs and tasks, such as eating, taking medication, and applying makeup, while seated within an interior cabin of the vehicle, leaving such food and personal items easily accessible for the driver or a vehicle occupant to grab as time permits.

However, these items are often perishable and/or can have low melting points which can't withstand the hot temperatures often present within vehicle cabins and hot climates, generally. Consequently, these items often melt or spoil before the vehicle occupants get a chance to consume or use them. This often results in the driver wasting time and money to restock the vehicle with the items for later consumption. Additionally, when such items melt, they often have a tendency to leak from their packaging and onto the seats and vehicle compartments, causing damage to the vehicle itself.

As a result, devices have been developed to maintain such food and personal items cool within a vehicle cabin using the cool air emitted from a vehicle's air conditioning system. However, many of these devices often require the use of complicated anchoring mechanisms and fasteners to secure the device to the vehicle cabin. Other systems include many components such as bulky cooling containers and/or hoses for directing the air through the car towards the containers. Further, the containers often can't be versatilely used with items of varying shapes and sizes, and therefore, many items remain melted and inoperable for use.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is provide a device which produces a complete solution to maintaining meltable items at sufficiently cool temperatures, and solidifying items which have melted within an interior cabin of a vehicle using an air conditioning system installed within the vehicle. Accordingly, the present disclosure presents a unitary item holder enabling the positioning of melted items in front of an existing air conditioning vent emitting cool air within the vehicle.

Another aspect of an example embodiment is to provide a device which can be versatilely used to hold an array of melted items such that the cooling air from the vent is directed over them. Accordingly, the present disclosure provides the item holder having a plate including a first end defining a pocket. The pocket is sized sufficiently large to accommodate variably sized and shaped items for solidification.

A further aspect of an example embodiment is to provide a device which is easily and efficiently anchored within the air conditioning vent such that the air from the air conditioning system is directed over the melted item oriented within the pocket. Accordingly, the present disclosure provides the plate sized to slide between a pair of adjacent slats within the vent, and further including a second, hook end directly opposing the pocket for anchoring the item holder within the vent, such that the pocket is aligned with the slat and the cool air emitted therethrough.

Yet a further aspect of an example embodiment is to provide a device which enables items to remain solidified within a heated interior cabin of a vehicle when the vehicle is not running for a set amount of time. Accordingly, the present disclosure provides the pocket lined with a cooling material, such as a layer of cooling gel, such that the layer retains a measure of coolness which can be imparted to the items to keep them from melting when the vehicle is momentarily not running.

Accordingly, the present disclosure describes a unitary item holder enabling the cooling and solidification of items within a vehicle having an air conditioning system and an associated air vent, especially those which have melted within the vehicle. The item holder includes a plate having a plate axis, a pocket, and a directly opposing hook end configured for sliding within the air vent and anchoring around a slat horizontally extending therein, such that the cool air from the conditioning system can be used to cool and solidify the items. The hook end is defined via the plate extending downwardly away from the plate axis. The pocket includes a pocket defined via the plate extending upwardly away from the plate axis for holding the melted items. In an example embodiment, the pocket further includes a cooling component for retaining coolness such that items can also remain cool and solidified when the vehicle is not running.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 3A:
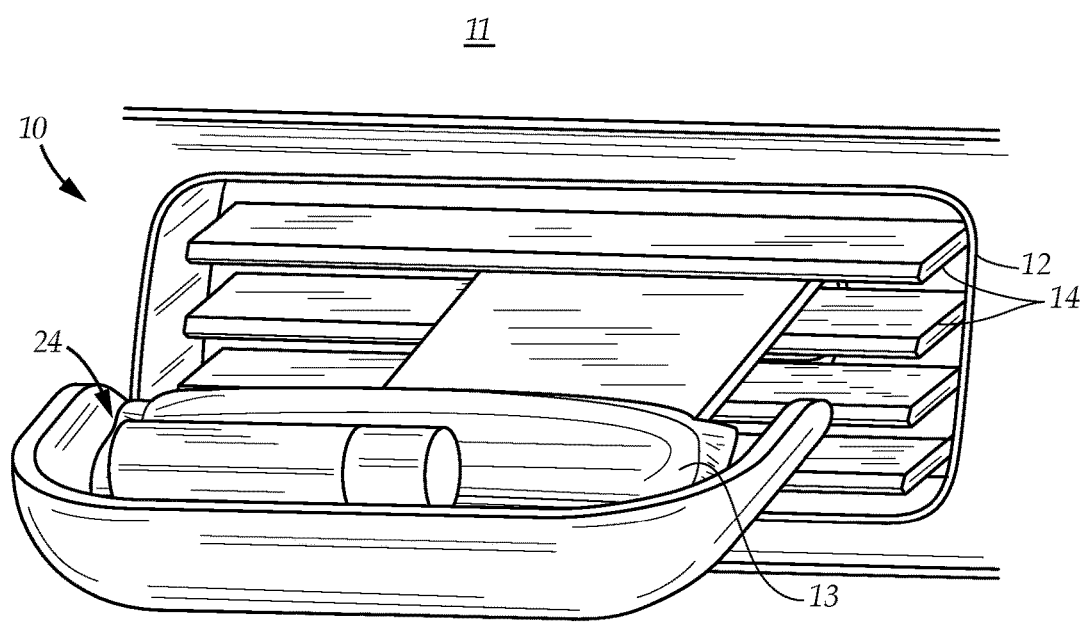
FIG. 3A is a diagrammatic perspective view of the second example embodiment of the item holder engaged for use with an air conditioning system and an associated air vent, according to the present disclosure.

FIG. 3A illustrates an example embodiment of a unitary item holder 10 in use with an air conditioning system, especially one installed within a vehicle including a cabin having a top 11, a bottom, and at least one air vent 12. The item holder 10 enables a user to cool and solidify a plurality of items 13 carried within the vehicle, especially those which have melted and/or are perishable in high temperatures within and without the cabin. Such items 13 include, but are not limited to, food items such as candy and power bars, hygiene and cosmetic items such as lipsticks, and varying medicines. The item holder 10 is configured for anchoring within the air vent 12, such as around a slat 14 horizontally traversing the vent 12. When thus oriented, both the slat 14 and the item holder 10 extend substantially parallel to the top 11 of the cabin such that the cool air generated via the conditioning system is directed through the vent 12 and towards the items 13 held within the item holder 10.

Figure 1A:
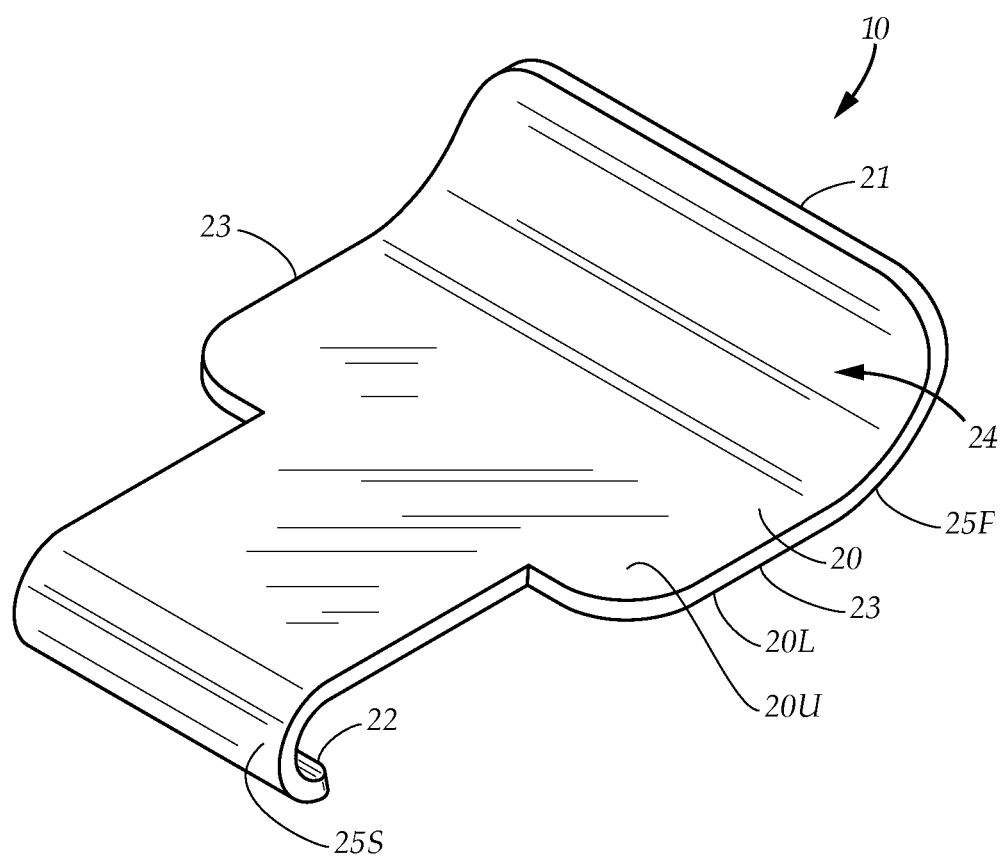
FIG. 1A is a diagrammatic perspective view of a first example embodiment of an item holder, according to the present disclosure.
Figure 2A:
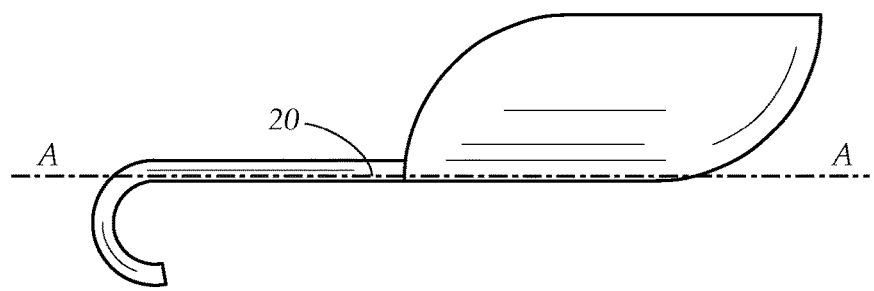
FIG. 2A is a side elevational view of an example embodiment of the second example embodiment of the item holder, according to the present disclosure.

FIG. 1A illustrates an example embodiment of the item holder 10 including a plate 20 having an upper surface 20U, a lower surface 20L, a first lateral edge 21, a second lateral edge 22, and a pair of longitudinal edges 23 extending between the lateral edges 21,22. The plate 20 further includes a plate axis A along which the plate 20 is configured to extend, best illustrated in FIG. 2A. The plate 20 includes a pocket 24 defined via a first bend 25F adjacent the first lateral edge 21, wherein the plate 20 extends upwardly away from the plate axis A. The pocket 24 is configured for holding an array of variably sized and shaped items for cooling and solidification.

Accordingly, the first lateral edge 21 extends upwardly a sufficient distance from the plate axis A to form a barrier for securely retaining the items within the pocket 24.

Figure 1B:
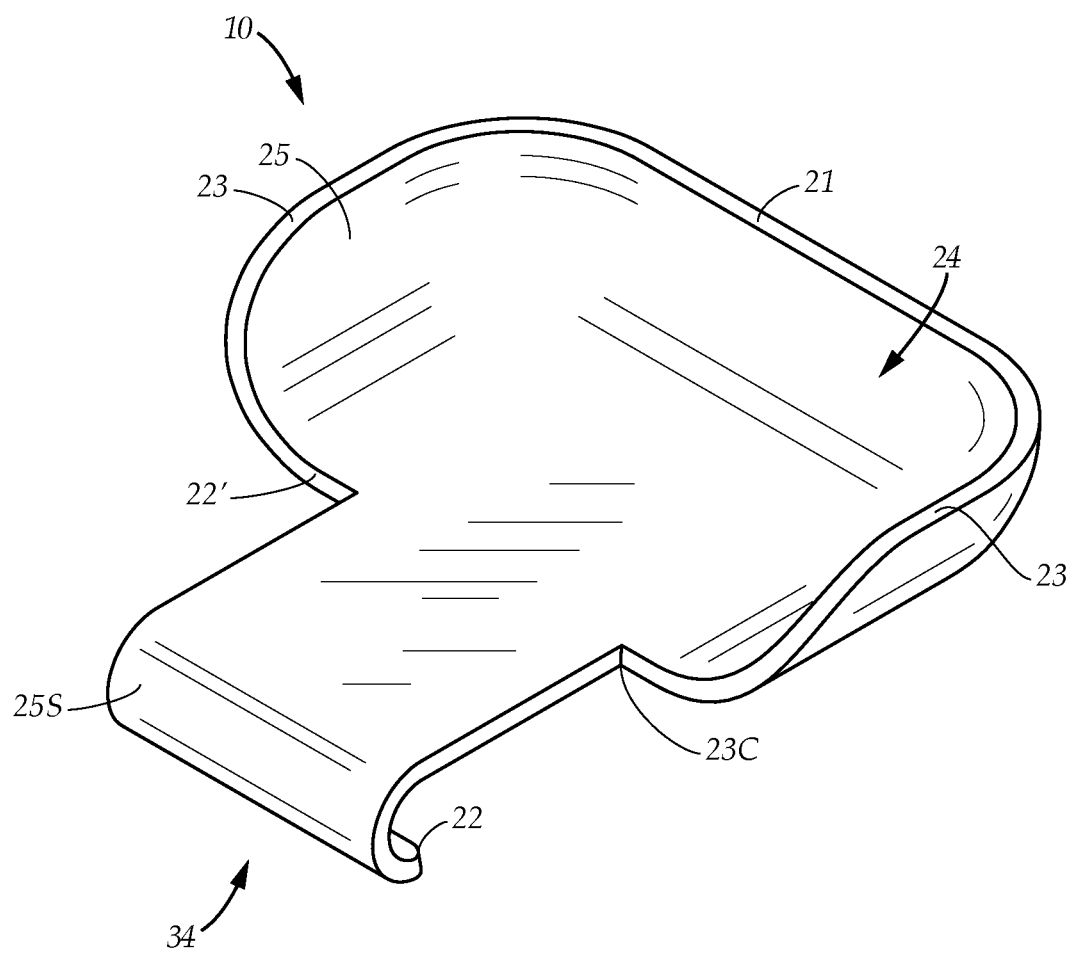
FIG. 1B is a diagrammatic perspective view of a second example embodiment of the item holder, according to the present disclosure.
Figure 4:
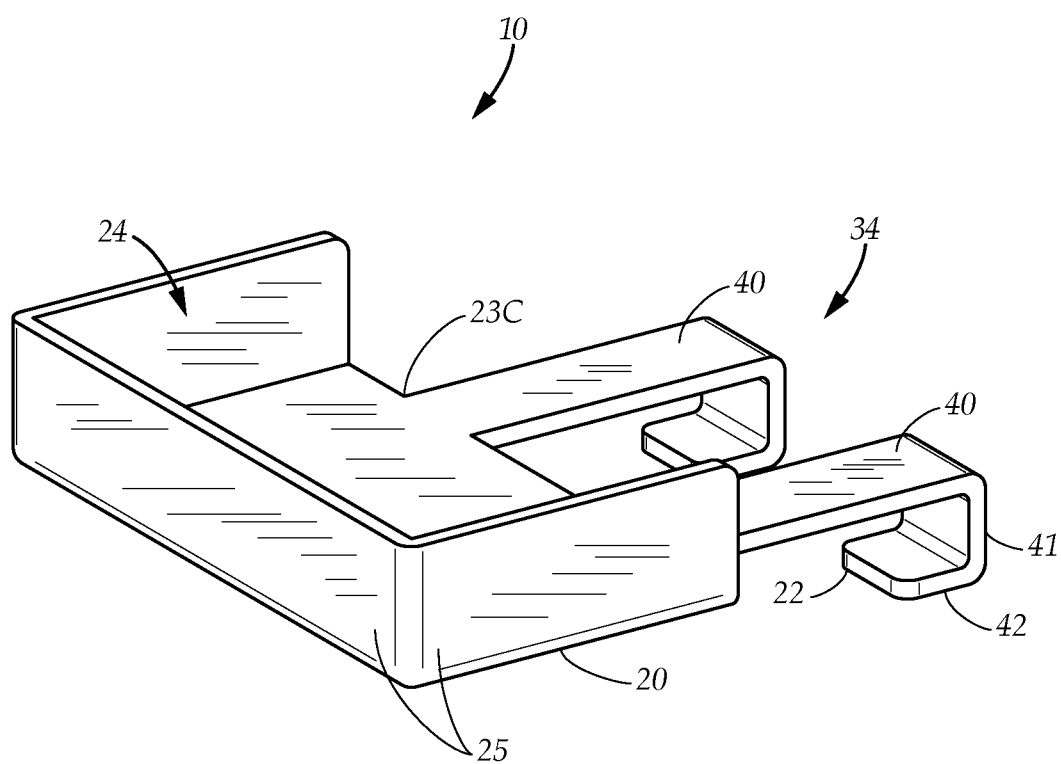
FIG. 4 is a diagrammatic perspective view of a third example embodiment of the item holder having a bifurcated hook end, according to the present disclosure.

The longitudinal edges 23 have an intermediate point 23C. In another example embodiment illustrated in FIGS. 1B and 2A, the longitudinal edges 23 curve upwardly away from the plate axis A between the intermediate point 23C and the pocket 24. As a result, the curved longitudinal edges 23 and the upwardly extending lateral edge 21 define a pocket 24 having at least one peripheral wall 25 for securely retaining the items therein. The pocket further has a pocket opening defined by the lateral and longitudinal edges of the pocket. For example, in the pocket 24 defined by the lateral edge 21 and the longitudinal edges 23, the pocket opening extends from the lateral edge 21 along each longitudinal edge 23, exposing the upper surface 20U. Yet further, FIG. 4 illustrates another example embodiment of the item holder 10 including the pocket 24, wherein the peripheral walls 25 are oriented substantially perpendicularly to the plate axis. The pocket further has a receiving area corresponding to the space defined by the first lateral edge, the longitudinal edges, and the peripheral walls, wherein the receiving area opens upwardly and is configured to receive and support the item within the pocket. In yet further example embodiments (not illustrated), the plate extends downwardly near the pocket, such as at the intermediate point, such that the first bend extends below the plate axis, and the first lateral edge extends upwardly towards and/or past the plate axis. When thus configured, the item holder can be manufactured to include pockets of varying depths. It is understood that the item holder can further include pockets of variable lengths and widths, to accommodate the aforementioned array of items.

Figure 2B:
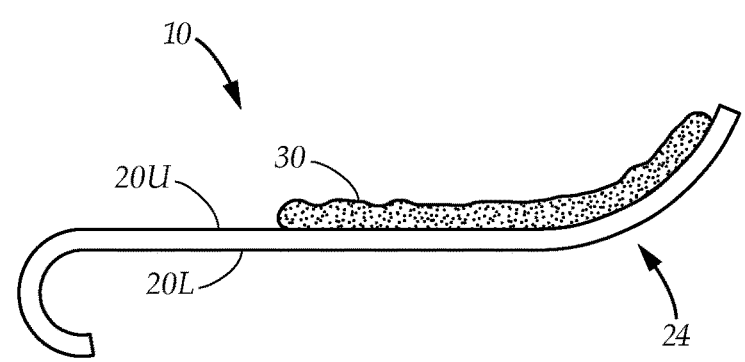
FIG. 2B is a side elevational view of another example embodiment of the first example embodiment of the item holder including a cooling component, according to the present disclosure.

Referring momentarily to FIG. 2B, the item holder 10 can further include a cooling component 30 for retaining coolness from the emitted air which can be imparted to the items within the pocket 24 when the air conditioning system is not activated. The cooling component 30 can extend across any portion of the plate 20, such as along the pocket 24, and along one or both of the upper surface 20U and the lower surface 20L. The cooling component 30 can be insulating and include, but is not limited to, a cooling layer, a cooling gel, and/or a cooling pad.

Figure 3B:
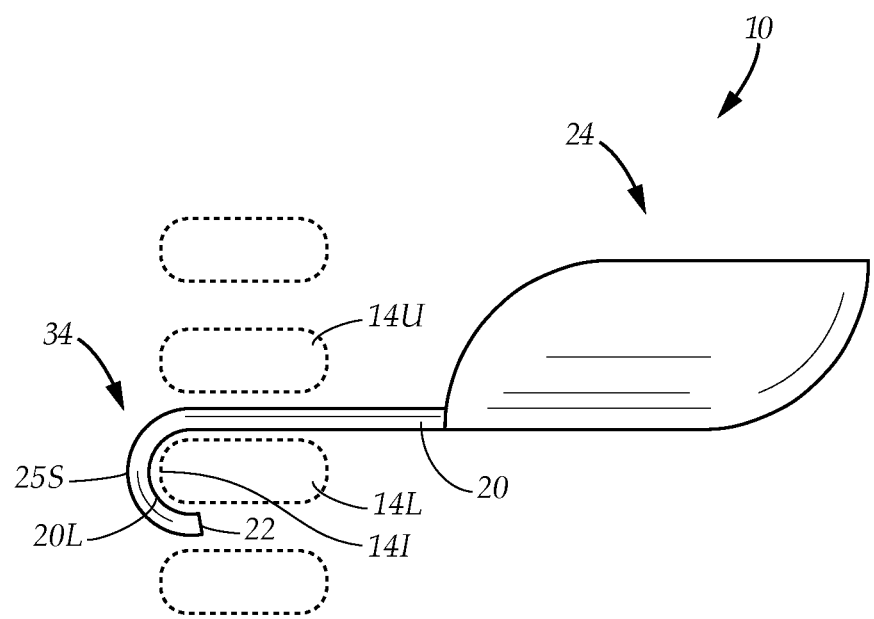
FIG. 3B is a side elevational view of the second example embodiment of the item holder anchored around a slat within the air vent, in broken lines, according to the present disclosure.

Referring now to FIG. 3B, the plate 20 further includes a hook end 34 directly opposing the pocket 24, the hook 34 defined via a second bend 25S adjacent the second lateral edge 22, wherein the plate 20 extends downwardly from the plate axis A. The hook end 34 is configured for operably anchoring the item holder 10 within the air vent, such as around a slat 14 having an interior edge 14I extending within the vent. More particularly, the plate 20 extends within the vent such that the lower surface 20L is anchored against the interior edge 14I of the slat 14 when the item holder 10 is engaged for use. When thus oriented, the pocket 24 is substantially aligned with the slats 14 such that the cool air is directed towards the item in the pocket 24. However, it is understood that the item holder can include a pivoting mechanism for rotating the pocket such that it is oriented substantially perpendicularly to the hook end should the slat vertically traverse the vent.

In some example embodiments, the plate 20 can narrow from the first lateral edge 21 towards the second lateral edge 22. For instance, in FIG. 1B, the plate 20 is divided substantially perpendicularly into thirds between the intermediate point 23C and the hook end 34, such that the outer thirds are removed and the second bend 25S is defined via the second lateral edge 22 of the middle third extending downwardly away from the plate axis. When thus configured, the pocket 24 also includes a second lateral pocket edge 22' from which the hook end 34 extends. Additionally, the plate can have variable lengths for accommodating slats of different sizes, such that the pocket be oriented proximally and/or distally from the vent when the hooked end is anchored therein.

Referring now to FIG. 4, another example embodiment of the hook end 34 of the item holder 10 is illustrated. The second bend of the hook end 34 is defined via a pair of segments, a first segment 41 extending substantially perpendicularly from the plate 20, and a second segment 42 extending from the first segment 41 directionally towards the pocket 24 and substantially parallel to the plate 20. However, it is understood that the hook end can include any number of segments to sufficiently anchor the item holder against the slat. Further, FIG. 4 illustrated an example embodiment of the item holder 10 wherein the hook 34 is bifurcated at least once, such as between the intermediate 23C point and the second lateral edge 22 of the plate, to form a pair of fingers 40. The fingers 40 can be of uniform and/or variable lengths. It is understood that while illustrated as a pair of fingers, the hook end can be further bifurcated to define a plurality of fingers.

FIGS. 3A and 3B illustrates an example method of use of the item holder. The step of aligning the pocket 24 with the cool air emitted through the vent 12 such that the items 13 therein are kept cool and/or solidified is achieved by slipping the hook end 34 in between a pair of horizontally oriented slats 14, an upper slat 14U and a lower slat 14L, until the hook 34 extends past the interior edge 14I of the slat 14. The step of anchoring the item holder 10 within the vent 12 is achieved by lowering the plate 20 onto the lower slat 14L such that the lower surface 20L is flush with the slat 14L, and pulling the item holder 10 outwardly away from the vent 12 until the lower surface 20L of the hook 34 engages the interior edge 14I of the slat 14. The step of cooling and solidifying the items 13 is achieved by placing the items 13 within the pocket 24 and activating the air conditioning system such that the vent emits cool air directed towards the pocket 24.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an item holder for use with an air conditioning system. The disclosure is illustrated by example in the drawing figures, and throughout the written description. It should be understood that numerous variations are possible, while adhering to the inventive concept. Such variations are contemplated as being a part of the present disclosure.

What is claimed is:

1. An item holder enabling the retention, solidification, and retrieval of at least one item which has melted in a vehicle having a top, a bottom, and an air conditioning system, the air conditioning system configured for emitting air through a vent, the vent including at least one slat horizontally traversing the vent such that the slat extends substantially parallel to the top of the vehicle, the slat having an interior edge extending within the vent, comprising:
   a substantially S-shaped plate having a first lateral edge, a second lateral edge, and a plate axis along which the plate is configured to extend when the device is anchored within the vent, the plate having an upper surface and a pocket, wherein the pocket is defined by the upper surface and a first bend near the first lateral edge, the first bend defined by the plate extending upwardly away from the plate axis such that the pocket opens upwardly and is configured to receive and retain the item for retrieval, the plate having a hook end defined via a second bend near the second lateral edge, the second bend defined by the plate extending downwardly away from the plate axis for operably anchoring the device within the vent; and
   wherein the plate has a lower surface and is configured to extend within the opening such that the lower surface of the second bend is anchored against the interior edge of the slat when the device is engaged for use and the pocket is substantially aligned with the slat to direct the air from the air conditioning system over the item when oriented on the upper surface of the plate.

2. The item holder as recited in claim 1, wherein the plate further has a pair of longitudinal edges oriented perpendicularly to the first lateral edge and second lateral edge, wherein the pocket is further defined by the upper surface, the first bend, and a pair of longitudinal bends near the longitudinal edges, wherein each longitudinal bend is defined by the plate extending upwardly away from the plate axis, wherein the first lateral edge and the pair of longitudinal edges extend upwardly a sufficient distance from the plate axis to form a barrier for securely retaining the item within the pocket, and wherein the pocket further has a pocket opening extending from the first lateral edge along each longitudinal edge which exposes the upper surface.

3. The item holder as recited in claim 2, wherein the plate narrows from the first lateral edge towards the second lateral edge such that the first lateral edge is substantially longer than the second lateral edge.

4. The item holder as recited in claim 3, wherein the plate has a pair of longitudinal edges extending between the pocket and the hook end, each of the edges having an intermediate point, the plate divided substantially perpendicularly into thirds between the intermediate point and the hook end such that the outer thirds are removed, the middle third curving downwardly from the plate axis.

5. The item holder as recited in claim 4, wherein the longitudinal edges curve upwardly away from the plate axis between the intermediate point and the pocket, such that the curved longitudinal edges and the upwardly extending first lateral wall together define at least one peripheral wall.

6. The item holder as recited in claim 4, wherein the plate extends downwardly at the intermediate point such that the first bend extends below the plate axis and the first lateral edge extends upwardly towards the plate axis.

7. The item holder as recited in claim 4, wherein the second bend is defined via a pair of segments, a first segment extending substantially perpendicularly to the plate axis, and a second segment extending from the first segment directionally towards the pocket and substantially parallel to the plate axis.

8. The item holder as recited in claim 1, wherein at least one of the upper surface and the lower surface has a cooling component.

9. The item holder as recite in claim 8, wherein the cooling component is operably removable and is selected from the group consisting of a cooling layer, a cooling gel, and a cooling pad.

10. A device enabling the retention, solidification, and retrieval of at least one item which has melted in a vehicle having a top, a bottom, and an air conditioning system, the air conditioning system configured for emitting air through a vent, the vent including at least one slat horizontally traversing the vent such that the slat extends substantially parallel to the top of the vehicle, the slat having an interior edge extending within the vent, comprising:
- a plate having a first end and a second end;
- a pocket at the first end for supporting the item, the pocket having a pair of longitudinal edges, and a pair of lateral edges, a first lateral pocket edge and a second lateral pocket edge, wherein the pair of longitudinal edges and the first lateral pocket edge of the plate extend upwardly from the pocket defining a plurality of peripheral walls, wherein the pocket further has a receiving area corresponding to the space defined by the first lateral pocket edge, the pair of longitudinal edges, and the peripheral walls, wherein the receiving area opens upwardly and is configured to receive and support the item within the pocket for retrieval; and
- a hook at the second end, the hook extending from the second lateral pocket edge, wherein the hook is configured for operably anchoring the device within the vent, substantially aligning the plate with the slat to direct the air from the air conditioning system over the item when oriented within the device.

11. The device as recited in claim 10, wherein the peripheral walls are oriented substantially perpendicularly to the plate.

12. The device as recited in claim 11, wherein the plate has an upper surface and an lower surface, the lower surface of the hook anchored against the interior edge of the slat when the device is engaged for use.

13. The device as recited in claim 12, wherein at least one of the upper surface and the lower surface has a cooling component.

14. The device as recite in claim 13, wherein the cooling component is operably removable and is selected from the group consisting of a cooling layer, a cooling gel, and a cooling pad.

15. The device as recited in claim 10, wherein the hook is bifurcated at least once to form a first finger and a second finger.

16. The device as recited in claim 10, wherein the hook includes a pair of segments, a first segment extending substantially perpendicularly from the plate, and a second segment extending from the first segment directionally towards the pocket and substantially parallel to the plate.

17. The device as recited in claim 15, wherein the hook is bifurcated between an intermediate point and the second lateral pocket edge, wherein the second lateral pocket edge extends away from the first finger and the second finger towards the longitudinal edges.

\* \* \* \* \*